United States Patent [19]
Goldenthal et al.

[11] Patent Number: 5,884,267
[45] Date of Patent: Mar. 16, 1999

[54] AUTOMATED SPEECH ALIGNMENT FOR IMAGE SYNTHESIS

[75] Inventors: William D. Goldenthal, Cambridge; Jean-Manuel Van Thong, Arlington; Keith Waters, West Newton, all of Mass.

[73] Assignee: Digital Equipment Corporation, Maynard, Mass.

[21] Appl. No.: 804,761

[22] Filed: Feb. 24, 1997

[51] Int. Cl.$^6$ .................................................. G10L 9/00
[52] U.S. Cl. ........................................ 704/276; 704/270
[58] Field of Search ................................. 764/200, 276, 764/243, 245, 254, 260, 235, 250; 370/389, 392; 379/90.01, 93.01; 704/270

[56] References Cited

U.S. PATENT DOCUMENTS

| | | | |
|---|---|---|---|
| 4,913,539 | 4/1990 | Lewis ........................................ | 352/87 |
| 5,608,839 | 3/1997 | Chen ........................................ | 704/235 |
| 5,613,056 | 3/1997 | Gasper et al. ........................... | 704/276 |
| 5,625,749 | 4/1997 | Goldenthal et al. ..................... | 704/254 |
| 5,630,017 | 5/1997 | Gasper et al. ........................... | 704/276 |
| 5,657,426 | 8/1997 | Waters et al. ........................... | 704/276 |

OTHER PUBLICATIONS

"Expression control using synthetic speech," Wyvill et al., ACM Siggraph '89, State of the Art in Facial Animation, 16th Annual Conf. On Computer Graphics & Interactive Techniques, Boston, Mass. 31 Jul.–4 Aug. 1989.

"A Media Conversion from Speech to Facial Image for Intelligent Man–Machine Interface," Morishima et al., IEEE Journal on Selected Areas in Communications, vol. 9, No. 4, May 1991.

"Automated Lip–Synch and Speech Synthesis for Character Animation," Lewis et al., Computer Graphics Lab New York Institute of Technology, 1987 ACM–0–89791–213–6/87/0004/0143.

"Read My Lips . . . and My Jaw!" Le Goff et al., ESCA, Eurospeech '95, 4th European Conf. On Speech Communication and Technology, Madrid, Sep. 1995. ISSN 1018.4074.

"Automated Lip–sync: Background and Techniques," Lewis, The Journal of Visualization and Computer Animation, vol. 2: 118–122 (1991).

"A Model for Human Faces that Allows Speech Synchronized Animation," Parke, Conf. On Compuer Graphics and Interactive Techniques, 15–17 Jul. 1974, sponsored by the Univ. Of Colorado Computing Center and ACM/SIG-GRAPH.

"Talking Heads Mean Business," The Sunday Times, 2 Feb. 1997, http://www.sunday–times.co.uk/news/pages/Sunday–Times/stiinnnws02003.html?1585884.

*Primary Examiner*—David R. Hudspeth
*Assistant Examiner*—Susan Weiland
*Attorney, Agent, or Firm*—Graham & James LLP

[57] ABSTRACT

In a computerized method, speech signals are analyzed using statistical trajectory modeling to produce time aligned acoustic-phonetic units. There is one acoustic-phonetic unit for each portion of the speech signal determined to be phonetically distinct. The acoustic-phonetic units are translated to corresponding time aligned image units representative of the acoustic-phonetic units. An image including the time aligned image units is displayed. The display of the time aligned image units is synchronized to a replaying of the digitized natural speech signal.

44 Claims, 3 Drawing Sheets

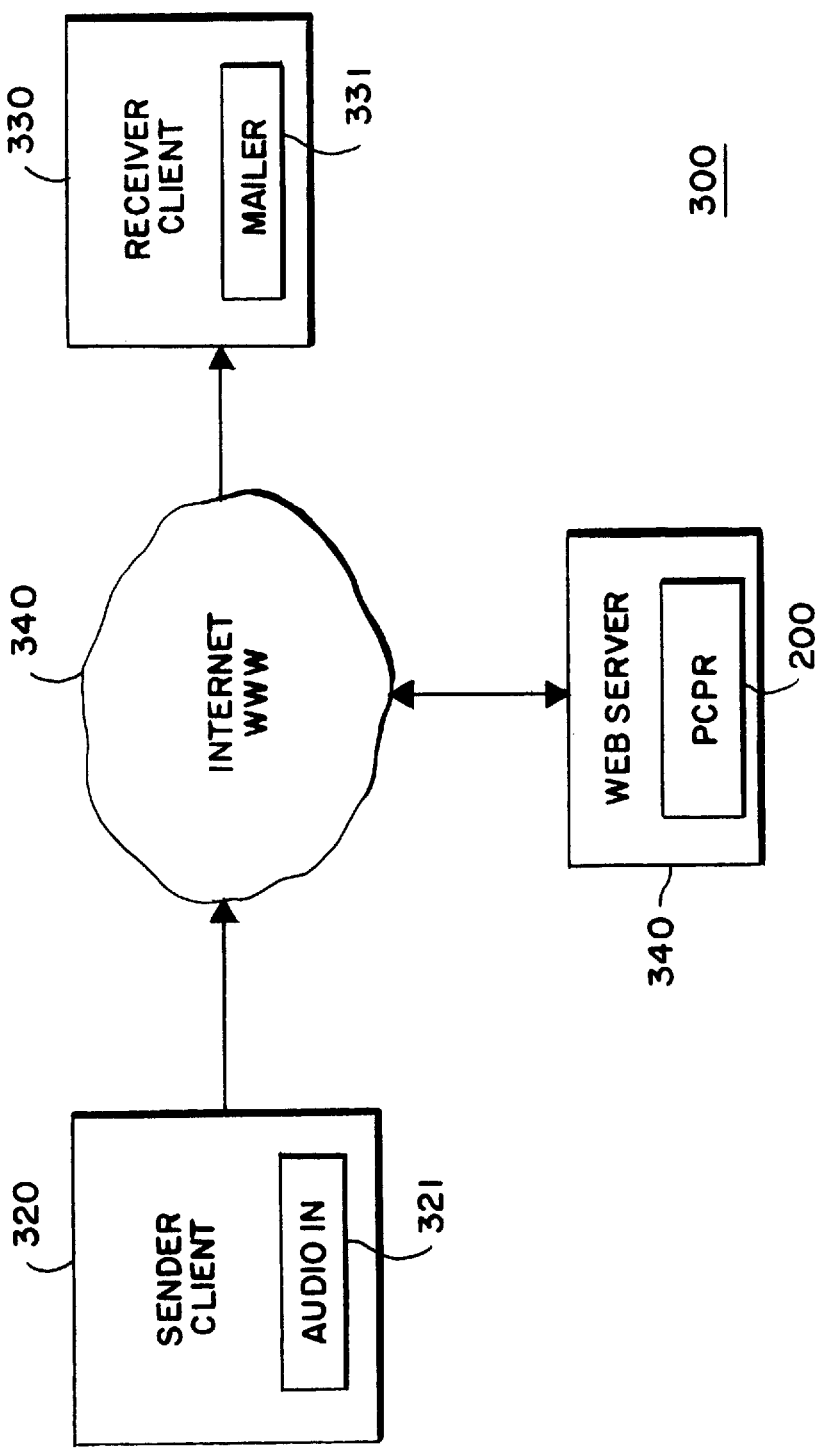

AUTOMATED SPEECH ALIGNMENT FOR IMAGE SYNTHESIS

FIELD OF THE INVENTION

The present invention relates generally to audio-visual signal processing, and more particularly to aligning speech signals with synthetically generated facial images.

BACKGROUND OF THE INVENTION

For some computer applications, it is desired to dynamically time align an animated image with audio signals. For example, most modem computers are commonly equipped with a "sound-card." The sound card can process and reproduce audio signals such as music and speech. In the case of speech, the computer can also dynamically generate a facial image which appears to be speaking, e.g., a "talking head."

Such an audio-visual presentation is useful in speech reading and learning applications where the posture of the mouth is important. Other applications can include electronic voice mail, animation, audio visual presentations, web based agents seeking and retrieving audio data, and interactive kiosks, such as automated teller machines. In these applications, the facial image facilitates the comprehensibility of the audible speech.

An important problem when time aligning the audio and visual signals is to make the audio-visual speech realistic. Creating a realistic appearance requires that the speech be accurately synchronized to the dynamically generated images. Moreover, a realistic rendering should distinctly reproduce, to the finest level of detail, every facial gesture which is associated with every portion of continuous natural speech.

One conventional synchronization method uses a "frame-by-frame" technique. The speech signal is analyzed and aligned to a timed sequence of image frames. This technique lacks the ability to resynchronize in real time to perform what is called "adaptive synchronization." As a result, unanticipated real time events can annoyingly cause the synchronization to be lost.

In another technique, the dynamic images of a "talking head" are adaptively synchronized to a speech signal, see U.S. patent application Ser. No. 08/258,145, "Method and Apparatus for Producing Audio-Visual Synthetic Speech" filed by Waters et al. on Jun. 10, 1994. There, a speech synthesizer generates fundamental speech units called phonemes which can be converted to an audio signal. The phonemes can be translated to their visual complements called visemes, for example mouth postures. The result is a sequence of facial gestures approximating the gestures of speech.

Although this technique allows a tight synchronization between the audio and visual signals, there are certain limitations. The visual images are driven by input text, and not human speech. Also, the synthetic speech sounds far from natural, resulting in an audio-visual dichotomy between the fidelity of the images and the naturalness of the synthesized speech.

In the prior art, some techniques are known for synchronizing natural speech to facial images. In one technique, a coarse-grained volume tracking approach is used to determine speech loudness. Then, the relative opening of the mouth in the facial image can be time aligned to the audio signals. This approach, however, is very limited because mouths do not just simply open and close as speech is rendered.

An alternative technique uses a limited speech recognition system to produce broad categorizations of the speech signal at fixed intervals of time. There, a linear-prediction speech model periodically samples the audio waveform to yield an estimated power spectrum. Sub-samples of the power spectrum representing fixed-length time portions of the signal are concatenated to form a feature vector which is considered to be a "frame" of speech. The fixed length frames are typically short in duration, for example, 5, 10, or 20 ms, and bear no relationship to the underlying acoustic-phonetic content of the signal.

Each frame is converted to a script by determining the Euclidian distance from a set of reference vectors stored in a code book. The script can then be translated to visemes. This means, for each frame, substantially independent of the surrounding frames, a "best-fit" script is identified, and this script is used to determine the corresponding visemes to display at the time represented by the frame.

The result is superior to that obtained from volume metrics, but is still quite primitive. True time-aligned acoustic-phonetic units are never realized. The technique does not detect the starting and ending of acoustic-phonetic units for each distinct and different portion of the digitized speech signal.

Therefore, it is desired to accurately synchronize visual images to a speech signal. Furthermore, it is desired that the visual images include fine grained gestures representative of every distinct portion of natural speech.

SUMMARY OF THE INVENTION

In the present invention, a computerized method is used to synchronize audio signals to computer generated visual images. A digitized speech signal acquired from an analog continuous natural speech signal is analyzed to produce a stream of time aligned acoustic-phonetic units. Acoustic-phonetic units are hypothesized for portions of the input speech signal determined to be phonetically distinct. Each acoustic-phonetic unit is associated with a starting time and an ending time of the phonetically distinct portion of the speech signal.

The time-aligned acoustic-phonetic units are translated to corresponding time aligned image units representative of the acoustic-phonetic units. Then, an image including the time aligned image units is displayed while synchronizing to the speech signal. The image units correspond to facial gestures producing the speech signal. The rendering of the speech signal and image can be performed in real-time as speech is generated.

In one aspect of the invention, the acoustic-phonetic units are of variable durations, and correspond to fundamental linguistic elements. The phonetic units are derived from fixed length frames of speech processed by a pattern classifier and a phonetic recognizer using statistical trajectory models.

In another aspect of the invention, the speech signals are acquired by a first client computer system, and the speech signal and the image are rendered in a second client computer system by communicating phonetic and audio records. Each phonetic record includes an identity of a particular acoustic-phonetic unit, and the starting and ending time of the acoustic phonetic unit.

BRIEF DESCRIPTION OF THE DRAWINGS

FIG. 3 is a block diagram of a distributed audio-visual synchronization system.

DETAILED DESCRIPTION OF PREFERRED EMBODIMENTS

Figure 1:
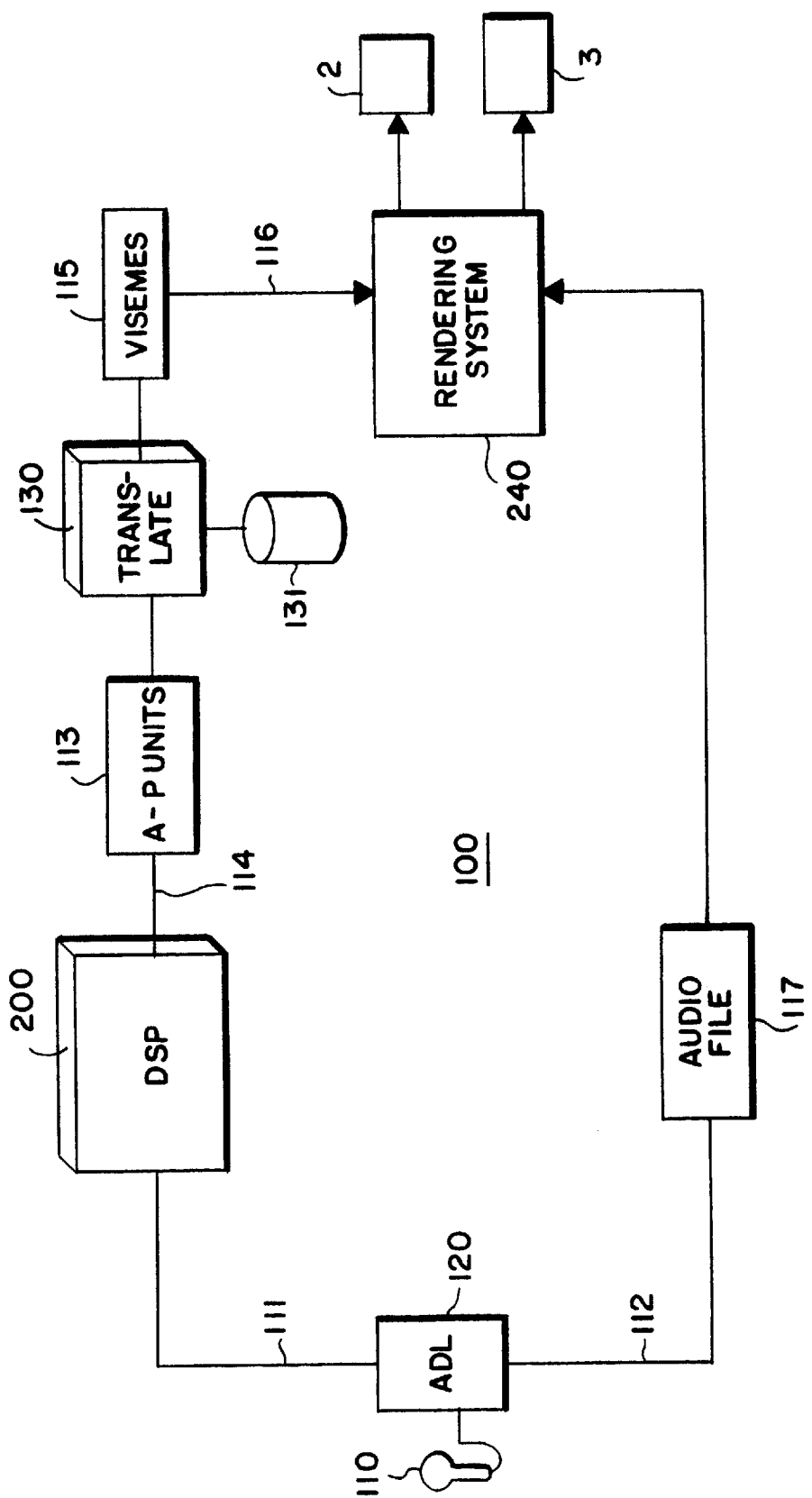
FIG. 1 is a block diagram of a audio-visual synchronization system according to the invention.

FIG. 1 shows a computer implemented system 100 for synchronizing audio signals, such as human speech, to visual images, such as an animated talking head rendered on a display screen 2. In FIG. 1, the analog audio signals are acquired by a microphone 110. An analog-to-digital convertor (ADC) 120 translates the audio to digital signals on lines 111 and 112.

Although the example system 100 is described in terms of human speech and facial images, it should be understood that the invention can also process other audio signals and animated images, such as barking dogs, or inanimate objects capable of producing sounds with distinctive frequency and power spectrums.

A digital speech processing (DSP) sub-system 200, described in further detail below, converts the digital speech signals to time aligned acoustic-phonetic units (A-P UNITS) 113 on line 114. The units 113, which have well defined and time aligned boundaries and transitions, are acoustic realizations of their linguistic equivalents called phonemes. A translator 130 using a dictionary 131 converts the acoustic-phonetic units 113 to time-aligned visemes 115 on line 116.

The digital audio signals on line 112 can be communicated in the form of an audio file 117, for example, a ".wav" file. The visemes 115 and the audio file 117 are processed by a rendering sub-system 240. The rendering sub-system includes output devices: a display screen 2, and a loudspeaker 3.

Figure 2:
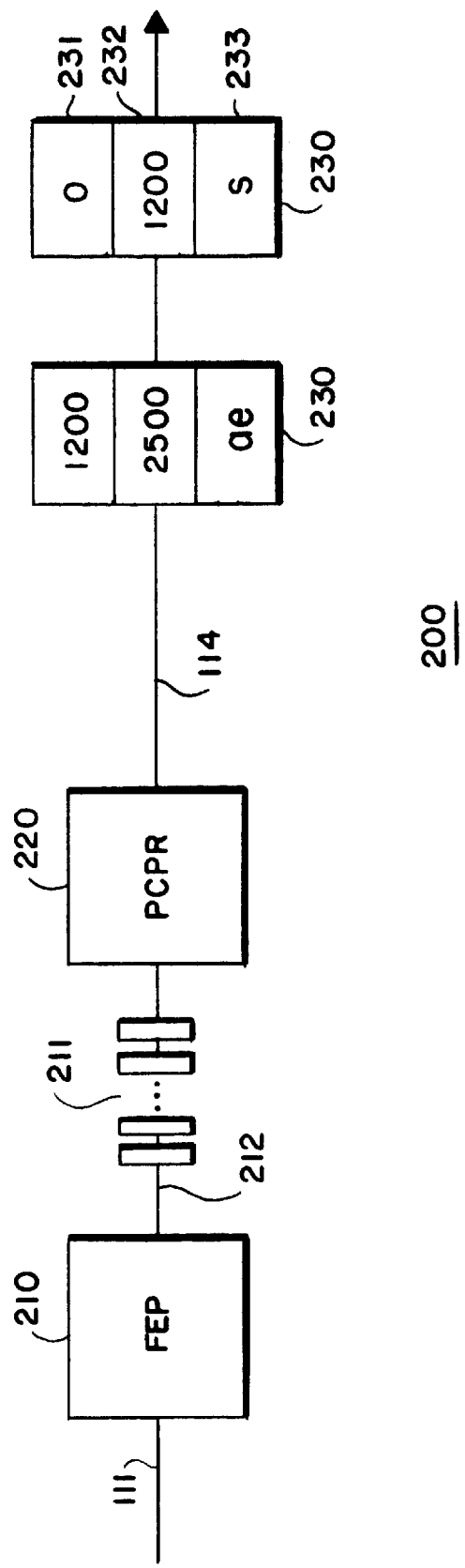
FIG. 2 is a block diagram of a pattern classifier and pattern recognizer sub-system of the system of FIG. 1.

FIG. 2 shows the DSP 200 in greater detail. A front-end preprocessor (FEP) 210 converts the digital audio signals to a temporal sequence of vectors or overlapping observation frames 211 on line 212. The frames 211 can be in the form of feature vectors including Mel-Frequency cepstral coefficients (MFCC). The coefficients are derived from short-time Fourier transforms of the digital signals. The MFCC representation is described by P. Mermelstein and S. Davies in *Comparison of Parametric Representation for Monosyllabic Word Recognition in Continuously Spoken Sentences*, IEEE Trans ASSP, Vol. 23, No. 1, pages 67–72, February 1975.

The cepstral coefficients provide a high degree of data reduction, since the power spectrum of each of the frames is represented using relatively few parameters. Each frame parameterizes a set of acoustic features which represent a portion of the digitized audio signal at a given point in time. Each frame includes, for example, the MFCC parameters.

The frames 211 are processed by a pattern classifier and phonetic recognizer (PCPR) 220. The PCPR uses a segment based approach to speech processing. The segment based approach is called statistical trajectory modeling (STM). For a detailed description of STM as applied to speech processing, see U.S. patent application Ser. No. 293,584 entitled *Apparatus and Method for Speech Recognition*, filed by Goldenthal et al., on Aug. 22, 1994, incorporated herein by reference.

According to STM, each set of acoustic models comprise "tracks" and error statistics. Tracks are defined as a trajectory or temporal evolution of dynamic acoustic attributes over segments of speech. During statistical trajectory modeling, a track is mapped onto designated segments of speech of varying duration. The designated segments can be units of speech, for example, phones, or transitions from one phone to another.

The purpose of the tracks is to accurately represent and account for the dynamic behavior of the acoustic attributes over the duration of the segments of the speech signals. The error statistics are a measure of how well a track is expected to map onto an identified unit of speech. The error statistics can be produced by correlating the difference between synthetic units of speech generated from the track with the actual units of speech. The synthetic unit of speech can be generated by "deforming" the track to conform to the underlying acoustic unit of speech.

As shown in FIG. 2, the acoustic-phonetic units are formatted as data records 230. Each record 230 includes three fields. A starting time 231, an ending time 232, and an identification 233 of the corresponding acoustic-phonetic unit. The acoustic units correspond to phonetically distinct portions of the speech signal such as phones or transitions between phones. The acoustic-phonetic units are translated to visemes and further processed by the rendering sub-system 240. The rendering system can be as described by Waters et al., cited above.

Because of the statistically stationary segments produced by the STM technique, time alignment of the acoustic-phonetic units to visemes can be extremely accurate. This is particularly true for phones in consonant classes which are not handled well, if at all, by the prior art techniques.

Although, the invention has been described with respect to the visemes being related to mouth gestures, it should be understood that other facial gestures could also be synchronized, such as the eyes, eyelids, eyebrows, forehead, ears, nose, and jaw.

In one embodiment of the invention, the system components of FIG. 1 can be incorporated into a single computer system.

FIG. 3 shows an alternative embodiment configured as a distributed computer system 300. The distributed system 300 can use the Internet with the World-Wide-Web (WWW, or the "web") interface 310. The system 300 includes a sender client computer 320, a receiver client computer 330, and a web server computer 340.

The sender client computer 320 includes hardware and software 321 to acquire analog audio signals, and to forward the signals digitally to another client computer, for example, the receiver client 330 using Internet and WWW standard communication protocols. Such a system is described in U.S. patent application Ser. No. 08/710,696 filed by Weikart et al. on Sep. 19, 1996. The web server computer 340 includes the PCPR sub-system 200 as described above. The receiver client computer 330 includes a mail receiver sub-system enhanced with the rendering sub-system 240 of FIG. 1.

During operation of the system 300, a user of the sender client 320 provides an audio message for one or more recipients. The audio message can be in the form of a ".wav" file. The message is routed via the web server computer 340 to the receiver client computer 330. The PCPR 200 of the web server 340 appends the .wav file with the appropriate time-aligned phonetic records 230. Then, the user of the receiver client can "hear" the message using the mailer 331. As the message is being played back, the rendering sub-system will provide a talking head with facial gestures substantially synchronized to the audio signal.

It should be understood that the invention can also be used to synchronize visual images to streamed audio signals in real time. For example, a web-based "chat room" can be configured to allow multiple users to concurrently participate in a conversation with multiple synchronized talking heads. The system can also allow two client computers to exchange audio messages directly with each other. The PCPR can be located in either client, or any other accessible portion of the network. The invention can also be used for low-bandwidth video conferencing using, perhaps, digital compression techniques. For secure applications, digital signals can be encrypted.

The foregoing description has been directed to specific embodiments of this invention. It will be apparent, however, that variations and modifications may be made to the described embodiments, with the attainment of all or some of the advantages. Therefore, it is the object of the appended claims to cover all such variations and modifications as come within the spirit and scope of this invention.

We claim:

1. A computerized method for synchronizing audio signals to computer generated visual images comprising the steps of:

analyzing an audio signal to produce a stream of time aligned acoustic-phonetic units, there is one acoustic-phonetic unit for each portion of audio signal determined to be phonetically distinct, each acoustic phonetic unit having a starting time and an ending time of the phonetically distinct portion of the audio signal;

translating each acoustic-phonetic unit to a corresponding time aligned image unit representative of the acoustic-phonetic unit; and displaying an image including the time aligned image units while synchronizing to the audio signal.

2. The method of claim 1 wherein the audio signal is a continuous natural speech signal and wherein the analyzing further includes converting the audio signal to a digitized speech signal before analyzing the continuous natural speech signal.

3. The method of claim 1 wherein the acoustic-phonetic units have variable durations.

4. The method of claim 1 wherein the acoustic-phonetic units can be interpreted as fundamental linguistic elements.

5. The method of claim 1 further comprising the steps of:

partitioning the audio signal into a sequence of frames; and processing the frames by a pattern classifier and phonetic recognizer.

6. The method of claim 5 further comprising:

applying statistical trajectory models while processing the frames.

7. The method of claim 1 wherein the visemes correspond to facial gestures.

8. The method of claim 1 further comprising the steps of:

acquiring the audio signal by a first client computer system; and rendering the audio signal and the image in a second client computer system.

9. The method of claim 8 further comprising:

communicating phonetic records between the first and second client computer systems, each phonetic record including an identity of a particular acoustic-phonetic unit, and the starting and ending time of the acoustic phonetic unit.

10. The method of claim 9 further comprising the steps of:

formatting the audio signal in an audio data file; and appending the phonetic records to the audio data file.

11. The method of claim 9 wherein the first and second client computers are connected by a network, and further comprising:

analyzing the audio signal in a server computer system connected to the network.

12. The method of claim 1 further comprising:

performing the analyzing, translating, and displaying steps synchronously in real-time.

13. A method for synchronizing audio signals to computer generated visual images, the method comprising the steps of:

analyzing an audio signal to produce time aligned acoustic-phonetic units;

translating each one of the time aligned acoustic-phonetic units to a time aligned image unit representative of the each one to produce a stream of time aligned image units; and displaying the stream of time aligned image units wherein the stream of time aligned image units is synchronized to the audio signal.

14. The method of claim 13, wherein one of a set of distinct acoustic-phonetic units is produced for each portion of the audio signal determined by the analyzing to be phonetically distinct.

15. The method of claim 14, wherein the each one of the time aligned acoustic-phonetic units has a starting time and an ending time.

16. The method of claim 15, wherein the audio signal is a continuous analog natural speech signal.

17. The method of claim 13 wherein the audio signal is a continuous analog natural speech signal and the analyzing includes converting the continuous analog natural speech signal to a digitized speech signal before analysis.

18. The method of claim 13 wherein each one of the acoustic-phonetic units has a variable duration.

19. The method of claim 13 wherein the each one of the acoustic-phonetic units represents a fundamental linguistic element.

20. The method of claim 13 wherein the analyzing further includes:

partitioning the audio signal into a sequence of frames; and processing the sequence of frames by a pattern classifier and phonetic recognizer.

21. The method of claim 20 wherein the processing includes applying statistical trajectory models to the sequence of frames.

22. The method of claim 20 wherein each one of the time aligned image units corresponds to a facial gesture.

23. The method of claim 22, wherein the facial gesture corresponds to a fundamental linguistic element.

24. The method of claim 13 further comprising the steps of:

acquiring the audio signal from a first client processor; and playing back the audio signal and rendering the stream of time aligned image units in a second client processor connected to the first client processor, wherein the stream of time aligned image units is synchronized to the audio signal.

25. The method of claim 24 wherein the playing back and rendering further includes communicating phonetic records between the first and second client processors, each phonetic record including an identity of a particular acoustic-phonetic unit, and the starting and ending time of the particular acoustic phonetic unit.

26. The method of claim 25 wherein the acquiring includes formatting the audio signal in an audio data file and appending the phonetic records to the audio data file before the communicating.

27. The method of claim 26 wherein the first and second client processors are connected by a network, and wherein the analyzing is performed on a server processor connected to the network.

28. The method of claim 27 wherein the analyzing, and associating steps are performed synchronously in real-time.

29. The method of claim 28 wherein the acquiring, and playback and rendering steps are further performed synchronously in real-time.

30. A computing device for synchronizing audio signals to computer generated visual images, the computing device comprising:
   an audio signal; and
   a processor coupled to the audio signal, the processor configured to:
      analyze the audio signal to produce time aligned acoustic-phonetic units;
      to translate each one of the time aligned acoustic-phonetic units with a time aligned image unit representative of the each one to produce a stream of time aligned image units; and
      to display the stream of time aligned image units wherein the stream of time aligned image units is synchronized to the audio signal.

31. The computing device of claim 30, wherein one of a set of distinct acoustic-phonetic units is produced for each portion of the audio signal determined by the analyzing to be phonetically distinct.

32. The computing device of claim 31, wherein the each one of the time aligned acoustic-phonetic units has a starting time and an ending time.

33. The computing device of claim 32, wherein the audio signal is a continuous analog natural speech signal.

34. The computing device of claim 30, wherein the audio signal is a continuous analog natural speech signal and the analyzing includes converting the continuous analog natural speech signal to a digitized speech signal before analysis.

35. The computing device of claim 30, wherein each one of the acoustic-phonetic units has a variable duration.

36. The computing device of claim 30, wherein the each one of the acoustic-phonetic units represents a fundamental linguistic element.

37. The computing device of claim 30, wherein the processor is further configured to partition the audio signal into a sequence of frames and to process the sequence of frames by a pattern classifier and phonetic recognizer.

38. The computing device of claim 37, wherein the processor is further configured to apply statistical trajectory models to the sequence of frames.

39. The computing device of claim 30, wherein each one of the time aligned image units corresponds to a facial gesture.

40. The computing device of claim 39, wherein the facial gesture corresponds to a fundamental linguistic element.

41. The computing device of claim 30 further comprising:
   a first client processor; and
   a second client processor connected to the first client processor, wherein the first client processor is configured to acquire the audio signal from an input device and to communicate the audio signal to the second client processor and wherein the second client processor is configured to play back the communicated audio signal and render the stream of time aligned image units in the second processor wherein the stream of time aligned image units is synchronized to the communicated audio file.

42. The computing device of claim 41 wherein the first client processor is further configured to communicate phonetic records between the first and the second client processors, each phonetic record including an identity of a particular acoustic-phonetic unit, and the starting and ending time of the particular acoustic phonetic unit.

43. The computing device of claim 42 wherein the first client processor is further configured to format the audio signal in an audio data file and appending the phonetic records to the audio data file before communicating the audio signal to the second client processor.

44. The computing device of claim 43 wherein the first and second client processors are connected by a network, and further comprising a server processor connected to the network, the server processor configured to:
   analyze the audio signal acquired from the first client processor to produce time aligned acoustic-phonetic units;
   generate a set of phonetic records from the time aligned acoustic-phonetic units;
   append the set of phonetic records to the audio data file; and communicate the audio data file to the second client processor, wherein the second client processor is configured to play back the audio file and render the stream of time aligned image units using the appended set of phonetic records to synchronize the stream of time aligned image units to the audio signal.

* * * * *